United States Patent
Liu et al.

(10) Patent No.: US 12,542,072 B2
(45) Date of Patent: Feb. 3, 2026

(54) INJECTION TRAINING DEVICE

(71) Applicant: NOBLE INTERNATIONAL, LLC, Orlando, FL (US)

(72) Inventors: Tingting Liu, Orlando, FL (US); Shishuang Hou, Ningbo (CN); Jaysun Stockdell-Giesler, Oviedo, FL (US)

(73) Assignee: NOBLE INTERNATIONAL, LLC, Orlando, FL (US)

( * ) Notice: Subject to any disclaimer, the term of this patent is extended or adjusted under 35 U.S.C. 154(b) by 913 days.

(21) Appl. No.: 17/678,486

(22) Filed: Feb. 23, 2022

(65) Prior Publication Data

US 2022/0270513 A1 Aug. 25, 2022

Related U.S. Application Data

(60) Provisional application No. 63/152,621, filed on Feb. 23, 2021.

(51) Int. Cl.
 *G09B 23/28* (2006.01)

(52) U.S. Cl.
 CPC .................. *G09B 23/285* (2013.01)

(58) Field of Classification Search
 None
 See application file for complete search history.

(56) References Cited

U.S. PATENT DOCUMENTS

| | | |
|---|---|---|
| 2,607,626 A | 8/1952 | Tucci |
| 6,189,739 B1 | 2/2001 | von Schuckmann |
| 10,283,014 B2 * | 5/2019 | Baker ............... G09B 19/00 |
| 10,748,449 B2 * | 8/2020 | Baker ............... G09B 19/00 |
| 2009/0236445 A1 | 9/2009 | Lintern et al. |
| 2012/0193377 A1 | 8/2012 | Wong |

(Continued)

FOREIGN PATENT DOCUMENTS

| | | |
|---|---|---|
| WO | 2019079474 A1 | 4/2019 |
| WO | 2019142007 A1 | 7/2019 |
| WO | 2021042037 A2 | 3/2021 |

OTHER PUBLICATIONS

PCT/US2020/048756, PCT Search Report & Written Opinion mailed Feb. 11, 2021, 28 pages.

(Continued)

*Primary Examiner* — James B Hull
(74) *Attorney, Agent, or Firm* — Timothy H. Van Dyke; Wolter Van Dyke; Davis, Pllc

(57) ABSTRACT

An embodiment of a resettable injection training device is provided including a housing defining a receptacle having an opening, including a top side and a bottom side, a resettable, removable container receivable within the receptacle including a stopper that is movable within the container. The device also includes an actuation member configured to simulate actuation of an injection device, one or more sensors comprising a container sensor for detecting receipt of the container within the receptacle, a safety latch extending from the bottom side of the device, said safety latch for contacting an injection site, and a processor for detecting a condition of the one or more sensors, and optionally, providing feedback based on the condition detected. In a further embodiment, the device includes an adhesive associated with the housing for affixing the housing onto the injection site during use of the device.

17 Claims, 18 Drawing Sheets

| COMPARTMENT DOOR CLOSE FORCE | |
|---|---|
| PRD | 6-9 N |
| AFTER DESIGN | 6-15 N |

(56) References Cited

U.S. PATENT DOCUMENTS

| | | |
|---|---|---|
| 2015/0183571 A1 | 7/2015 | Anderson et al. |
| 2016/0293058 A1 | 10/2016 | Gaillot et al. |
| 2016/0335920 A1 | 11/2016 | Bendek et al. |
| 2021/0113776 A1* | 4/2021 | Hopkins .............. G09B 23/285 |

OTHER PUBLICATIONS

Aptar Pharma: Leader in Innovative Drug Delivery Systems, Downloaded from Internet Jun. 12, 2019, 3 pages.
Consort Medical, Nasal Spray Device Unidose Xtra, Downloaded from Internet Jun. 12, 2019, 5 pages.

* cited by examiner

| # | STATUS | # | STATUS |
|---|---|---|---|
| 1 | FRESH OFF PACKAGE (ADHESIVE IS NOT PRE-INSTALLED) (OPTIONAL) | 7b | IF THE DEVICE IS REMOVED FROM THE INJECTION SITE TOO EARLY, DEVICE ENTER ERROR MODE. |
| 2 | REMOVE BATTERY ISOLATOR. (OPTIONAL) | 8 | REMOVE FROM THE INJECTION SITE |
| 3 | OPEN THE DRUG COMPARTMENT DOOR | 9 | RESET TSA AND PLUNGER |
| 4 | INSERT CARTRIDGE AND CLOSE THE DOOR. | 10 | TSA IS BACK TO ORIGIN |
| 5 | REMOVE ADHESIVE LINER | 11 | OPEN THE DOOR TO RESET BUTTON |
| 6 | APPLY THE DEVICE ON THE INJECTION SITE AND PRESS THE BUTTON TO ACTIVATE THE DEVICE | 12 | REMOVE THE ADHESIVE PAD ASSEMBLY AND REPLACE WITH A NEW ONE. |
| 7a | INJECTION COMPLETED | 13 | CLOSE THE DRUG COMPARTMENT DOOR TO SEMI-OPEN STATUS. |

FIG. 17

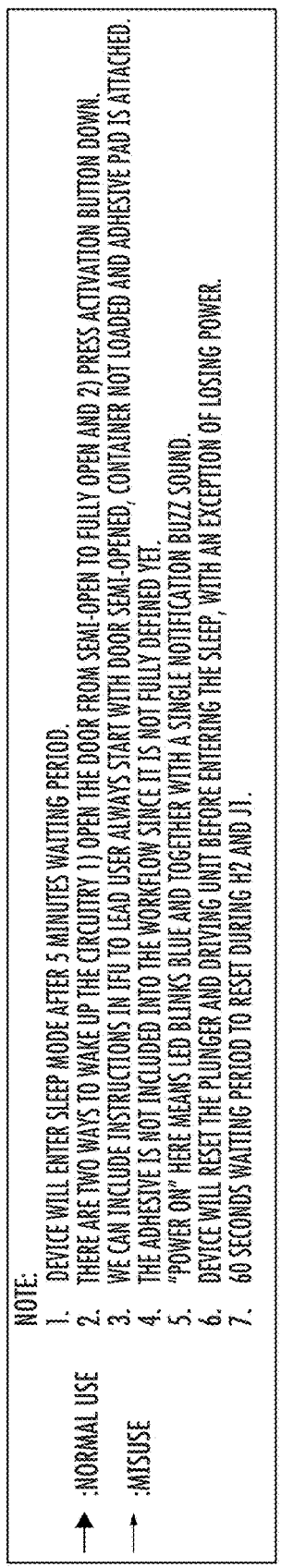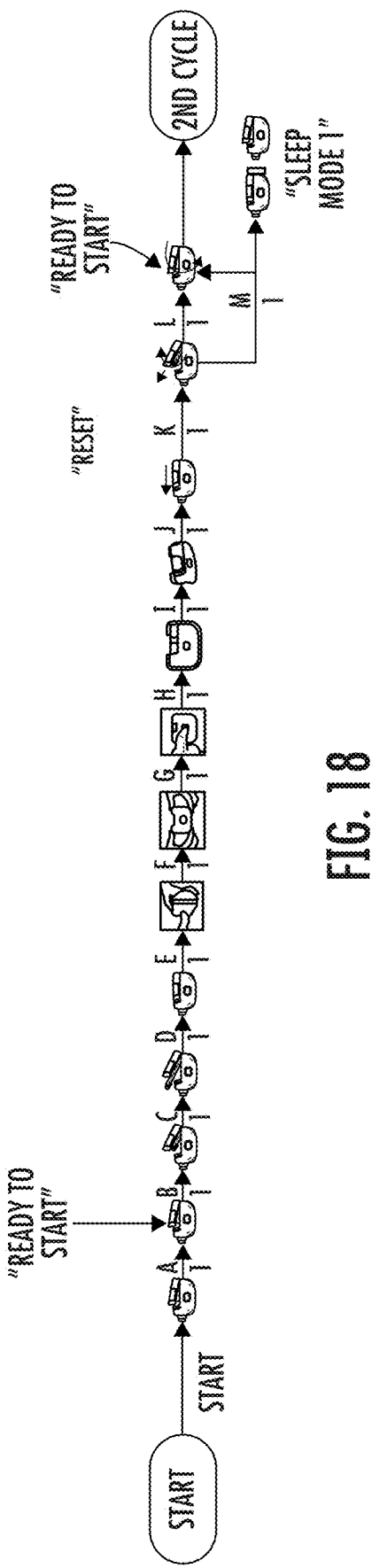
FIG. 18

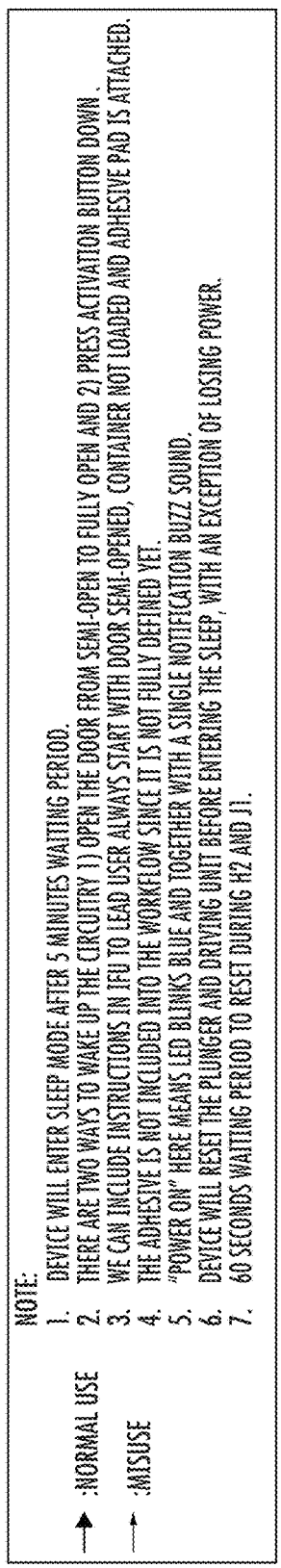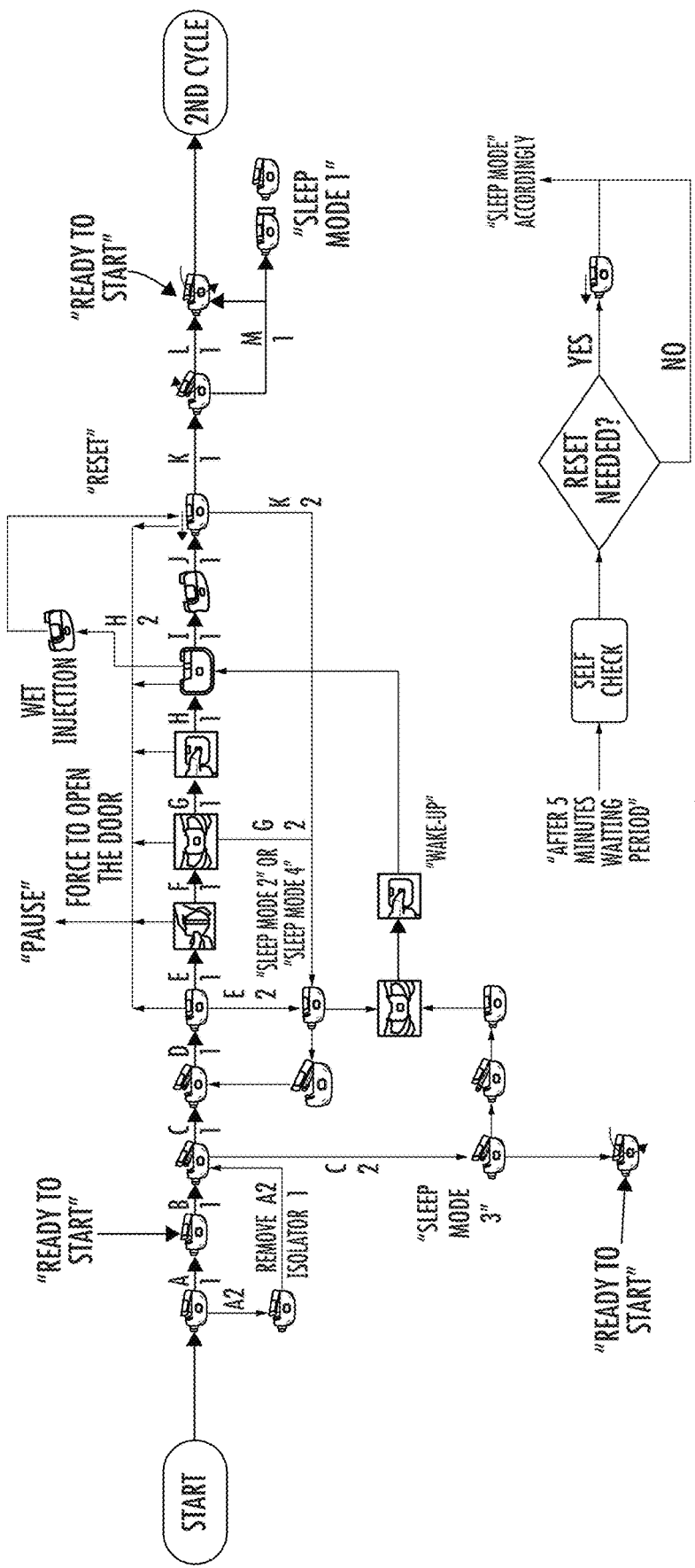
FIG. 19

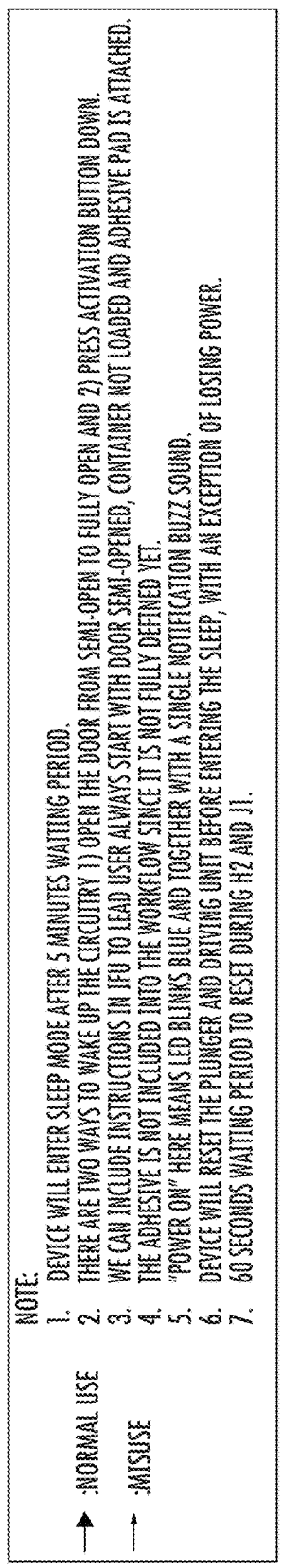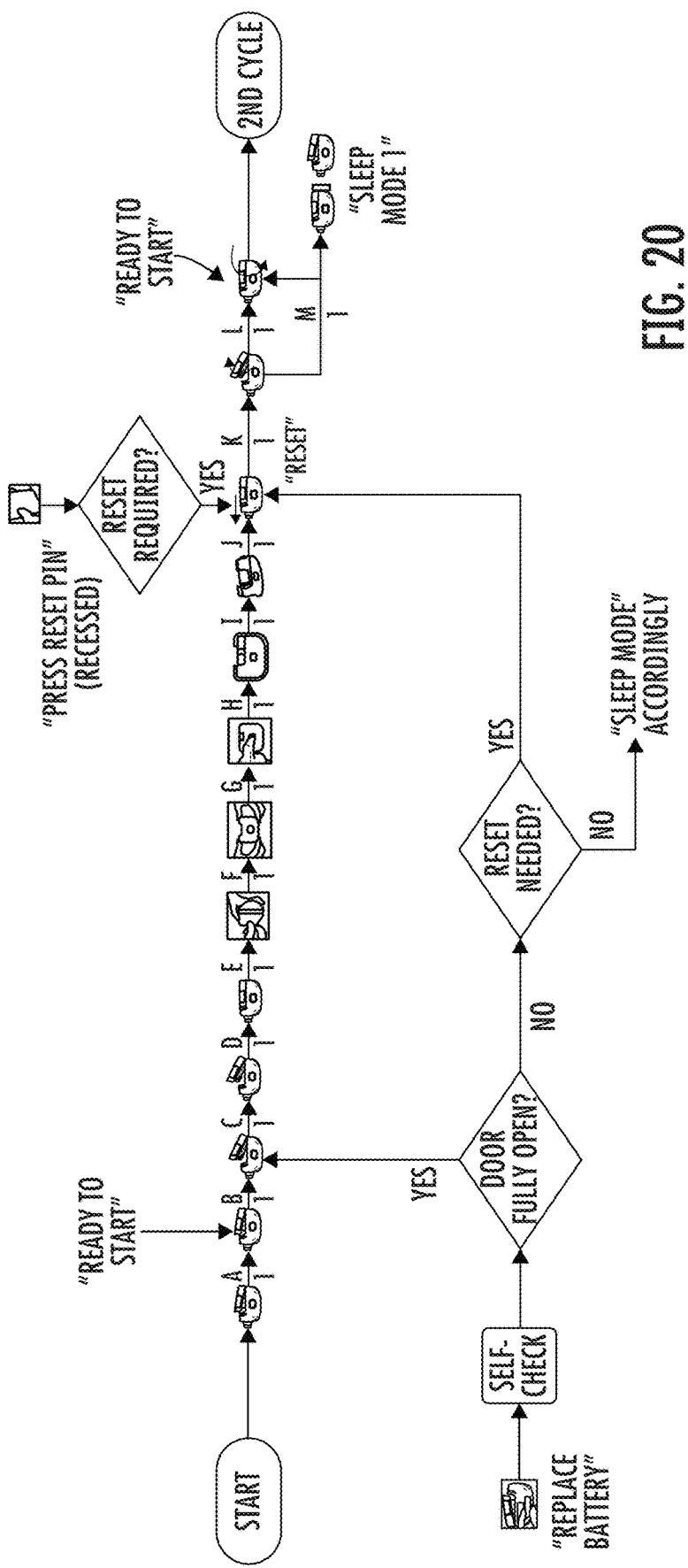
FIG. 20

SLEEP MODE

| | STATUS | NOTE |
|---|---|---|
| SLEEP MODE 1 | 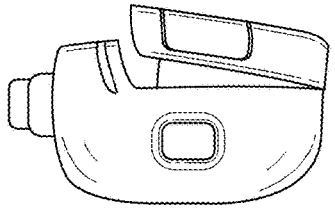 | • THE DRUG COMPARTMENT DOOR IS SEMI-CLOSED<br>• BUTTON IS INACTIVATED (RAISED POSITION) |
| SLEEP MODE 2 (BUTTON IN RAISED POSITION)<br>SLEEP MODE 4 (BUTTON IN DEPRESSED POSITION) | 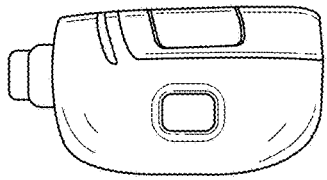 | • THE DRUG COMPARTMENT DOOR IS CLOSED<br>• CONTAINER IS LOADED<br>• PLUNGER IS AT THE STARTING POSITION<br>• BUTTON IS ACTIVATED (RECESSED POSITION) OR INACTIVATED (RAISED POSITION) |
| SLEEP MODE 3 | 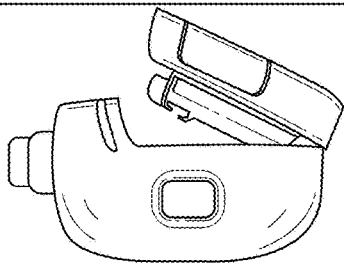 | • THE DRUG COMPARTMENT DOOR IS FULLY OPENED<br>• BUTTON IS INACTIVATED (RAISED POSITION) |

FIG. 21

SEQUENCE

| ACTIONS | COMMENTS | ACTIONS | COMMENTS |
|---|---|---|---|
| START | FIRST ACTIVATION: BRAND NEW DEVICE RIGHT AFTER TAKEN OFF THE PACKAGING | G1 | G1: PRESS THE ACTIVATION BUTTON TO ACTIVATE THE DEVICE |
| A1 | REMOVE THE ISOLATOR | G2 | G2: USER DOES NOT COMPLETE THE TRAINING CYCLE AND SETS THE TRAINER ASIDE. THE DEVICE ENTERS SLEEP MODE AFTER XX MINUTES |
| A2 | A2: THE DOOR HAS BEEN OPENED WITHOUT REMOVING THE ISOLATOR | H1 | H1: INJECTING |
| A21 | A21: DEVICE "POWER ON" IMMEDIATELY ONCE THE ISOLATOR IS REMOVED. LED LIGHT BLINKS BLUE AND BUZZ SOUND. | H2 | H2: IF THE USER TAKE OFF THE DEVICE FROM THE INJECTION SITE BEFORE THE INJECTION IS COMPLETED, MOTOR STOPS AND ERROR NOTIFICATION FOR 60 SECONDS. THEN DEVICE RESET AUTOMATICALLY |
| B1 | B1: OPEN THE DRUG COMPARTMENT DOOR TO "POWER ON" THE DEVICE. BLUE LED BLINKS AND BUZZ SOUND. | I1 | I1: AFTER INJECTION IS COMPLETED, USERS TAKE OFF THE DEVICE FROM THE INJECTION SITE. |
| C1 | C1: LOAD THE CONTAINER AND CLOSE THE DRUG COMPARTMENT DOOR. (THE DOOR WILL NOT STAY CLOSED IF CONTAINER IS NOT LOADED.) | J1 | J1: AFTER 60 SECONDS, DEVICE ENTERS RESET MODE. WE RECOMMEND TO ADD A DISTINCT LED TO SHOW DEVICE IS RESETTING. |
| C2 | C2: USER DOES NOT COMPLETE THE TRAINING CYCLE AND SETS THE TRAINER ASIDE. THE DEVICE ENTERS SLEEP MODE AFTER XX MINUTES | K1 | K1: AFTER THE LED TURNS OFF, USER OPENS THE COMPARTMENT DOOR TO REMOVE THE CONTAINER. IF THIS OCCURS BEFORE THE DEVICE ENTERS SLEEP MODE, THE DEVICE DOES NOT "POWER ON". NO BUZZ SOUND AND BLINKING BLUE LIGHT. WHEN THE DOOR IS OPEN, THE ACTIVATION BUTTON IS AUTOMATICALLY RESET TO INACTIVATED POSITION (RAISED POSITION) |
| D1 | D1: CLOSED THE DRUG COMPARTMENT DOOR. THE DOOR WILL STAY CLOSED. | K2 | K2: IF USER DO NOT OPEN THE DOOR IN A CERTAIN PERIOD, THE DEVICE WILL ENTER SLEEP MODE. |
| E1 | E1: PEEL THE ADHESIVE LINER. | L1 | L1: USER CLOSE THE DOOR (WILL STAY IN SEMI-CLOSED STATUS) AND START ANOTHER TRAINING CYCLE |
| E2 | E2: USER DOES NOT COMPLETE THE TRAINING CYCLE AND SETS THE TRAINER ASIDE. THE DEVICE ENTERS SLEEP MODE AFTER XX MINUTES | M1 | M1: USER IS DONE WITH THE TRAINING, STORE THE DEVICE BACK IN THE PACKAGING OR SET ASIDE (PACKAGING IS UNDEFINED YET) |
| F1 | F1: ADHERE THE DEVICE ON THE INJECTION SIGHT. (ORANGE LATCH PRESSED DOWN) | | |

FIG. 22

INJECTION TRAINING DEVICE

BACKGROUND

Injectable therapies are delivered in a number of methods, by prefilled syringe, auto-injection, or infusion, for example. Some subcutaneous and intradermal syringe infuser assemblies provide infusion from a prefilled syringe within the device. Patch pumps typically deliver compounds subcutaneously. Examples of these patch pumps include insulin patch infusers or other infusion devices containing needles. Wearable injection devices for controlled delivery of therapeutic agents are on the rise; however, there are limitations to these devices. Wearable patch pumps typically require the user, prior to administration of the therapeutic, to manually fill the pump by using a syringe or a vial. Most wearable patch pumps are not cost-efficient due to the design of the device providing medicament delivery. Auto injection devices are also used for subcutaneous therapeutic delivery, and are often more cost effective than wearable patch pumps; however, while these devices are typically lower in cost than other subcutaneous delivery devices, and are also typically easier to use, they are limited in terms of the type and amount of therapeutic they can deliver in one administration. Auto injectors cannot be used for the delivery of highly viscous medicaments, due to the short injection time available with an auto injection device. Injection volume is also limited by the ability of the subcutaneous tissue to receive a rapidly injected compound without pain due to the tissue distension, particularly when the compound has a high viscosity.

In addition to the abovementioned setbacks and difficulties often found with injectable therapies, perhaps the most concerning aspect related to injectable therapeutics relates to the user's ability to deliver an injection and deliver it effectively. Many injectable therapeutics are self-administered, and there is often a stigma with self-delivery of an injectable medication. Needle-anxiety and fear of failing to deliver a complete dose, inability to operate the dose-delivery device correctly, fear of accidental needle stick during manipulation of the dose delivery device, among other concerns, in users without any medical knowledge, or with medical training, can create a barrier to effective parenteral therapy. Furthermore, incorrect placement of the device on the target injection site on the user can prevent a user from obtaining an accurate dose of medicament, or can cause malfunctions in the device itself, resulting in noncompliance with the therapeutic regimen.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 17 is a chart detailing the actions that occur at each step shown in FIGS. 15-16.

FIG. 18 is a map of the logic and steps that occur during normal use of the device in a sequence according to one embodiment.

FIG. 19 is a map of the logic and steps that occur during incorrect use of the device according to one embodiment, demonstrating various errors that may occur in the use of the device.

FIG. 20 is a map of the logic and steps that occur to activate reset and to replace the battery of the device in one embodiment.

FIG. 21 provides a chart demonstrating various sleep modes, and the use of the device giving rise to each.

FIG. 22 provides details relating to each step in the sequence laid out in FIG. 18 during correct/normal use of the device and FIG. 19 which includes incorrect steps in the use of the device, and incorrect steps in the sequential use of the device.

DETAILED DESCRIPTION

Figure 2B:
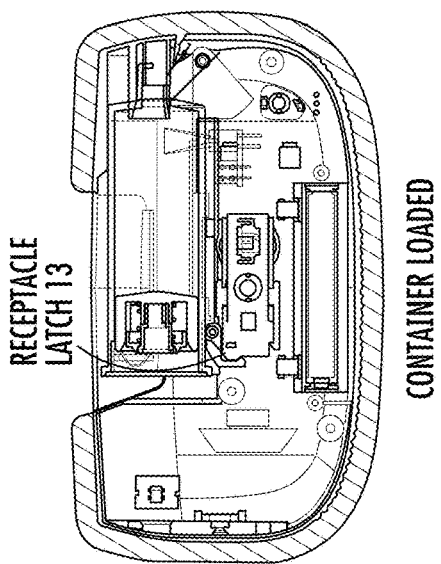
FIG. 2B is a partial sectional view of the resettable injection training device embodiment shown in FIG. 1.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another.

The term "sensor" or "sensors" as used herein may include but are not limited to, light sensors, fluid flow rate sensors, strain gauge sensors, temperature sensors, pressure sensors, tilt sensors, force sensors, level sensors, contact sensors, photoelectric sensors, magnetic sensors, ultrasonic sensors, electrochemical sensors, acceleration sensors, moisture sensors, humidity sensors, speed sensors, inductive sensors, capacitive sensors, and orientation sensors. Some of these sensors may require a supply of voltage. The device may include one or more of the sensors described herein, for example, a contact sensor may be used to detect whether the receptacle closure is open or closed over the opening of the receptacle, for example. In another non-limiting embodiment, a contact substrate sensor may be used to detect whether the removable layer is in contact with or is not in contact with the contact substrate. In some further, no limiting examples, the term sensor may be used to describe a switch used to detect a change in condition, for example, a contact switch. A sensor for detecting contact may include a sensor for detecting a fixation to a target site, for example, a contact sensor, a light sensor, or another sensor which may detect whether contact exists or fails to exist between the device or a portion of the device, and a contact surface, i.e., the contact site of a user or target site, for example.

In a further example, two or more sensors may be used to detect various features and/or conditions of the device or use thereof. In one embodiment, those sensors may include sensors for detecting contact, in other embodiments, a sensor for detecting contact and another sensor may be provided. In one non-limiting example, a sensor may include a microphone configured to detect sound and provide functionality and/or feedback to the user based thereon. In one example, a sensor for detecting contact and a microphone may be used in combination to detect removal of the device prior to completion of an injection training event. In this embodiment, a wet injection error may be detected, and appropriate feedback may be provided to the user. The microphone may detect one or more device or system sounds, such as the movement of one or more mechanical components of the device or system relative to one another. For example, the microphone may detect the sound of actuation of the actuation member indicating initiation of an injection training event. In another example, the microphone may detect movement of a retractable injection simulation member, which may optionally be included in the device, and may extend from the housing through the bottom surface of the housing toward a target surface upon actuation of the device. A microphone or motion sensor which detects movement of the injection simulation member by detecting sound produced as a result, may be used to indicate completion of the injection training event.

An example of an inductive sensor includes material embedded in or associated with the device, wherein said embedded or associated material proportionally changes the magnetic field of the inductive sensor which may be associated with or embedded in the container, in one non-limiting example, depending on its distance away from the inductive sensor. In one non-limiting embodiment, an inductive sensor or a contact sensor may be associated with the injection simulation member described in embodiments herein, or with a bottom surface of the housing of the device or the removable pad or adhesive, in order to determine contact with the user, or in other examples, to determine contact with a particular area of a user. The one or more sensors may be used to detect tissue-specific contact, in some non-limiting embodiments. The sensor then outputs a variable electrical signal based on the distance between the embedded or associated material and the inductive sensor. The embedded or associated material may be embedded in or associated with the container, and the inductive sensor positioned in the injection training device, at or near the receptacle, for example, or vice versa.

Sensors described herein may include any sensors known in the art including: contact sensors, orientation sensors, proximity sensors, resistive sensors, tactile and vibration sensors, temperature sensors, alignment sensors, motion sensors, accelerometers, gyroscopes, and perpendicularity light sensors, optoelectronic sensors, or any other sensor suitable for detecting positioning, movement, contact, location, or any of the conditions described herein.

The terms "associated" or "association," as used herein, includes but is not limited to direct and indirect attachment, adjacent to, in contact with, partially or fully attached to, and/or in close proximity therewith.

The term "communicatingly connected" as used herein may include a wired or a wireless connection, wherein said connection provides a communication of power and/or information between the injection training device and a remote device or smartphone, or between the injection training device and a cooperative package. In some non-limiting embodiments, communication between the injection training device and the package, for example, may include a one-way communication of power and/or information from the injection training device to the package, or from the package to the injection training device, and two-way communication of power and/or information to and from the injection training device and the package.

In at least one embodiment, a resettable injection training device is provided including a housing defining a receptacle having an opening, said housing comprising a top side and a bottom side, a resettable, removable container, receivable within the receptacle, said container comprising a stopper movable within the container, an actuation member configured to simulate actuation of an injection device, one or more sensors comprising a sensor for detecting receipt of the container within the receptacle, and a safety latch extending from the bottom side of the device, said safety latch for contacting an injection site; and a processor for detecting a condition of the one or more sensors, and optionally, providing feedback based on the condition detected.

In a further embodiment, the resettable injection training device may include a removable adhesive pad associated with the housing for affixing the housing onto the injection site during use of the device. In one example, the adhesive pad may include a removable adhesive for removably affixing the device to a target surface. In a further embodiment, the receptacle hinges from an open position to a closed position, wherein in the open position, the container is receivable within the receptacle. In a further embodiment, the resettable injection training device may include a receptacle latch, wherein when the container is received within the receptacle, the latch is in a closed position, and the receptacle may be moved to the closed position. In still a further embodiment, the resettable injection training device may include a receptacle sensor for detecting the position of the receptacle relative to the housing; and optionally, for detecting receipt of the container within the receptacle. In a further embodiment, the container sensor may detect when the container is fully engaged within the receptacle. In a further embodiment, the resettable injection training device may include a safety latch sensor for detecting whether the safety latch is in an open or closed position relative to the housing.

In a further embodiment, the resettable injection training device may include the container is fully engaged, the receptacle is in a closed position, and the safety latch is in a closed position, the actuation member is in an active position and can be actuated to initiate an injection training. In a further embodiment, the resettable injection training device may include an actuation member sensor for detecting actuation of the actuation member.

In a further embodiment, the resettable injection training device may include the actuation member comprises a compressible member that is compressible to initiate actuation of the device, such that actuation of the actuation member causes the member to move from a first position to a second position, wherein following actuation, the actuation member remains in the second position until reset of the device. In a further embodiment the safety latch is biased toward an open position, wherein when the device is positioned against a target site for a training, the safety latch moves to a closed position, and a safety latch lock is inactivated.

In a further embodiment, the actuation member is not actuatable until the container is received within the receptacle, the receptacle is in the closed position, and the safety latch is in the closed position. In a further embodiment, actuation of the actuation member initiates the container driving mechanism to engage the stopper to move distally within the container body to complete an injection simulation. In still a further embodiment, following actuation of the device, the actuation member is locked in the second position until reset of the device. In yet a further embodiment, the actuation member interfaces with an actuation member lock to lock the actuation member in the second position until reset of the device. In a further embodiment, the resettable injection training device may include a reset member for initiating reset of the device upon actuation of the reset member. In still a further embodiment, the resettable injection. In a further embodiment, activation of the reset member initiates reset of the container driving mechanism to its starting position. In still another embodiment, the device may include a container driving mechanism sensor for detecting reset of the container driving mechanism.

In one embodiment, following reset of the container, movement of the receptacle to its open position releases the actuation member lock to unlock the actuation member for a subsequent use of the device.

In a further embodiment, the resettable injection training device may include the removable adhesive pad is removably clipped onto the housing. In a further embodiment, the resettable injection training device may include a container status sensor for detecting a position of the stopper. In one non-limiting example, the container status sensor comprises an optoelectronic sensor. In one non-limiting embodiment, the sensor for detecting receipt of the container within the receptacle includes a container sensor.

In another embodiment, a method for training a user to deliver an injection with a resettable injection training device including a housing, a receptacle for receiving a resettable container, an actuation member to actuate the device, a safety latch for placement against a target surface, one or more sensors for sensing a condition of the device, and a processor, is provided. The method includes inserting a resettable removable container into a receptacle of a resettable injection training device, said receptacle having an open position and a closed position; moving the receptacle to its closed position; placing the resettable injection training device against a target surface such that the safety latch is moved to a closed position; and actuating the device by activating the actuation member. In a further embodiment, the device further comprises a signal output component, wherein feedback is delivered via the signal output component based on the condition of the device. In still a further embodiment, the device further comprises a removable adhesive pad containing an adhesive surface for affixing the housing to a target surface, wherein before the placing step, a removable adhesive pad is attached to the housing.

Figure 1:
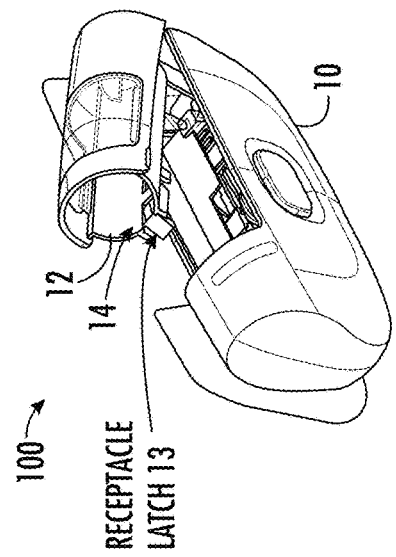
FIG. 1 is a perspective view of a resettable injection training device embodiment.
Figure 4:
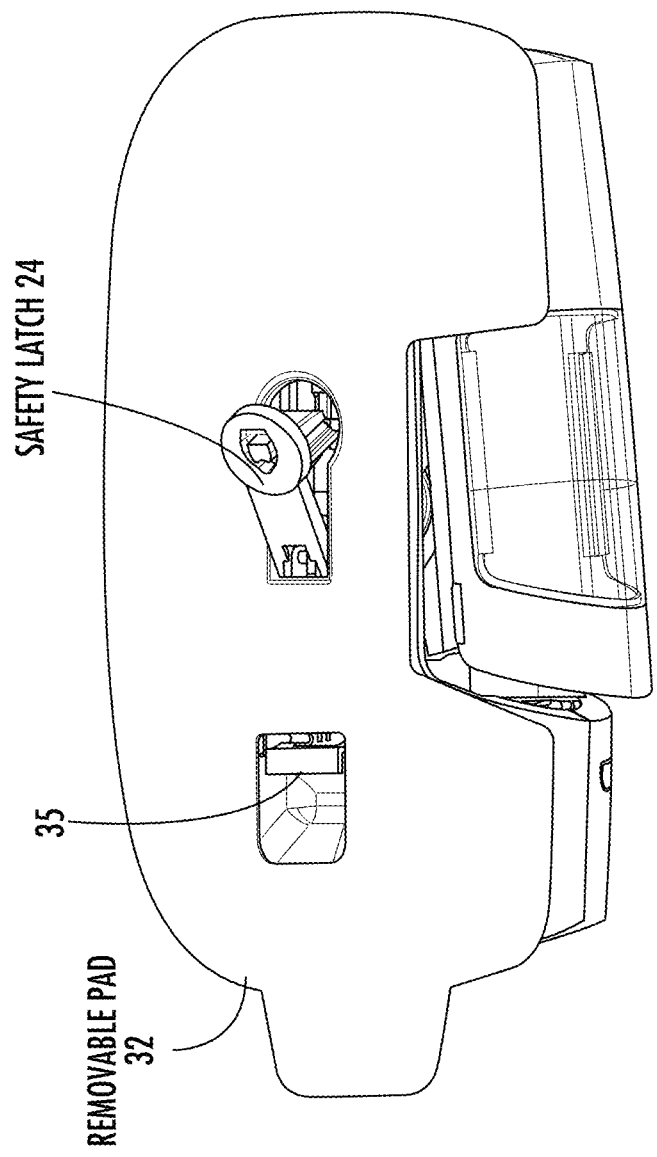
FIG. 4 is a view of the back side of the resettable injection training device embodiment shown in FIG. 1.

Referring to the drawings, in at least one embodiment as shown in FIG. 1 a resettable injection training device 100 is provided. The training device 100 includes a housing 10 defining a receptacle 12 having an opening 14, the housing having a top side 10a and a bottom side 10b, a resettable and removable container 16, wherein the container 16 is receivable within the receptacle 12. The container 16 includes a stopper 17 movable therewithin. The device 100 further includes an actuation member 18 configured to simulate actuation of an injection device 20. The actuation member 18 initiates actuation of the injection training device 100. The device 100 may further include one or more sensors 22 including, in non-limiting embodiments, a sensor for detecting receipt of the container 16 within the receptacle 12. The device 100 may also include a safety latch 24 as shown in FIG. 4 extending from the bottom side 10b of the device 100, the safety latch 24 for contacting an injection site or target site 26. The device 100 may also include a processor 28 for detecting a condition of the one or more sensors 22, and optionally, providing feedback based on the condition detected. In a further embodiment, the device 100 includes an adhesive layer 30 associated with the housing 10 or associated with an optionally removable pad 32 attachable to the housing 10, for affixing the housing 10 onto the injection site 26 during use of the device 100.

In at least one embodiment, the optionally removable adhesive pad 32 may include the adhesive layer 30 to removably affix the device to a target surface. The removable pad 32 may be removably affixed to the housing 10. The adhesive pad 32 may be clipped on to the device 100, and therefore removed and replaced as needed. The removable pad 32 may be attached to the device 100 by other means, including but not limited to a hook and loop attachment, or alternatively may be attached by a permanent attachment in one non-limiting embodiment. As shown in FIG. 4, the removable pad may be removed from the housing 10 by pressing or manipulating an adhesive protrusion 35 to release the removable adhesive pad 32 from the device 10 so that it may be removed and replaced with a new removable adhesive pad 32.

Figure 2A:
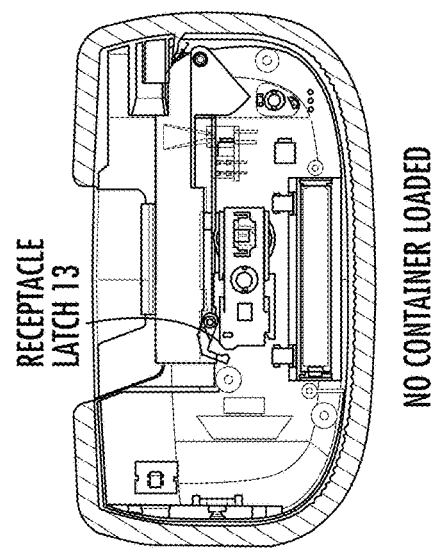
FIG. 2A is a partial sectional view of the resettable injection training device embodiment shown in FIG. 1.

In the embodiment shown in FIG. 1, the receptacle 12 hinges from an open position to a closed position as shown in FIGS. 2A, 2B, wherein in the open position shown in FIG. 1, the receptacle 12 is open and ready to receive a container 16. The device 100 may further include a receptacle latch 13 shown in FIGS. 1, 2A, 2B, wherein when the container 16 is correctly received within the receptacle 12, the latch 13 is in a closed position as shown in FIG. 2B, and the receptacle 12 may be moved to the closed position as shown in FIG. 2B. FIG. 2A shows an embodiment wherein no container 16 is received within the receptacle 12, and the receptacle 12 is moved toward a closed position; however the latch 13 will not allow the receptacle 12 to remain in the closed position until a container 16 is loaded into the receptacle. As shown in FIG. 2A the latch 13 remains open until the container is fully and correctly loaded into the receptacle 12.

The device may further include a number of sensors including, for example, a receptacle sensor 22b as shown in FIG. 14A for detecting the position of the receptacle 12 relative to the housing 10 and determining whether the receptacle is in an open or closed position, and furthermore the receptacle sensor 22b can be used to detect whether the container 16 is loaded in the receptacle 12, as if the container 16 is not loaded into the receptacle 12, the receptacle 12 will not close in at least one embodiment. Consequently, indirectly, whether a container has been loaded into the receptacle can be detected by the receptacle sensor 22b detecting whether a container 16 has been received within the receptacle 12 by detecting a position of the receptacle 12 and a receptacle latch sensor detecting whether the receptacle latch 13 is in a locked or unlocked position.

As an alternative, or in addition to the receptacle sensor 22b shown in FIG. 14A, the container sensor 22a may be used to detect whether the container 16 is fully engaged within the receptacle 12. An error condition may occur if the container 16 is only partially engaged within the receptacle.

In another embodiment, the device 100 may further include a safety latch sensor 22d as shown in FIG. 14A for detecting whether the safety latch 24 is in an open or a closed position relative to the housing 10. The safety latch 24 may be biased in an open position as shown in FIG. 4, in one embodiment, and upon placement of the device 100 against a target surface, the safety latch 24 may be moved to its closed position in preparation for use of the device 100. The safety latch sensor 22d may sense whether the safety latch 24 is in a closed position and may send a signal to the processor that the device 100 is in position against the target surface and is ready for use. Once the container 16 is correctly loaded into the receptacle 12 and the receptacle 12 is in a closed position, the device 100 may be activated, for example, by actuating the actuation member 18 to begin a training.

In one embodiment of the device 100 when the container 16 is fully engaged, the receptacle 12 is in a closed position, and the safety latch 24 is in a closed position, the actuation member 18 is in an active position and can be actuated to initiate an injection training. In contrast, if any of the: container 16 is not fully engaged, the receptacle 12 is not in a closed position, and the safety latch 24 is not in a closed position, the actuation member 18 is not in an active position and cannot be actuated to initiate an injection training, in one example. In another embodiment, the safety latch 24 may be optional, or may be optionally open or closed, consequently, closure of the safety latch 24 may not be required to initiate an injection training (to place the actuation member 18 in an active position to allow initiation of an injection training).

Figure 3C:
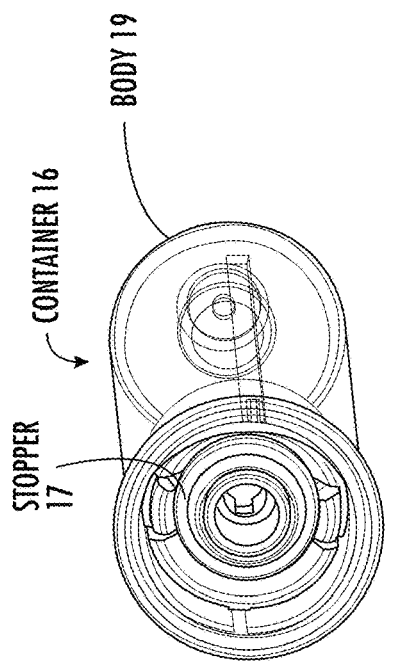
FIG. 3C-3D are perspective views of a resettable container embodiment.
Figure 3D:
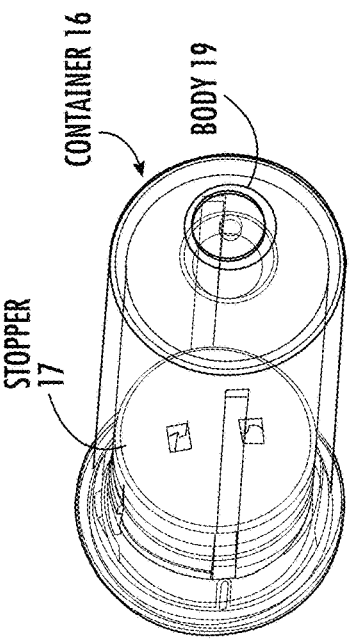
Figure 3A:
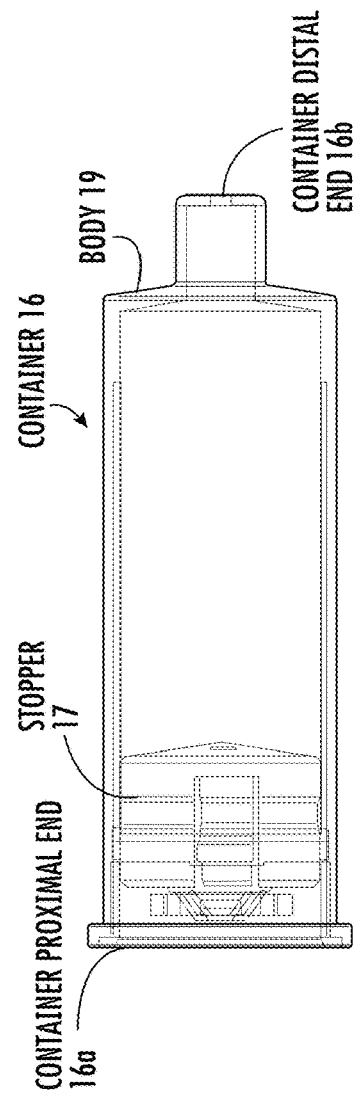
FIGS. 3A-3B are side views of the internal components of a resettable container embodiment.
Figure 3B:
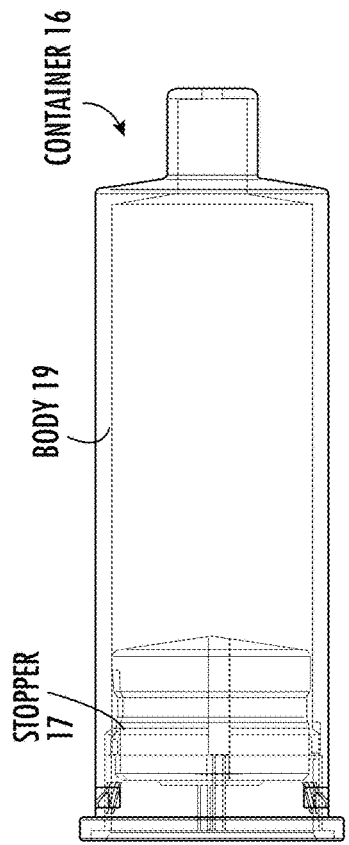

FIGS. 3A-3D provide various views of a resettable container 16 including a body 19 having container proximal end 16a and a container distal end 16b, a stopper 17 for traveling between the container proximal end 16a and the container distal end 16b. In some embodiments, the container body 19 may include a flanged portion near or at the container proximal end 16a as shown in FIGS. 3A-3D. FIGS. 3A-3B provide side views of the container 16, and FIGS. 3C-3D provide a bottom and a top view, respectively, of the container 16. In some embodiments as shown in FIGS. 10A-10D and as described below in greater detail, movement of the stopper between the proximal and distal ends occurs via a container driving mechanism 36 shown in FIGS. 10A-10D. A flex arm is shown in the side view of FIG. 3B in association with the container 16.

Figure 5:
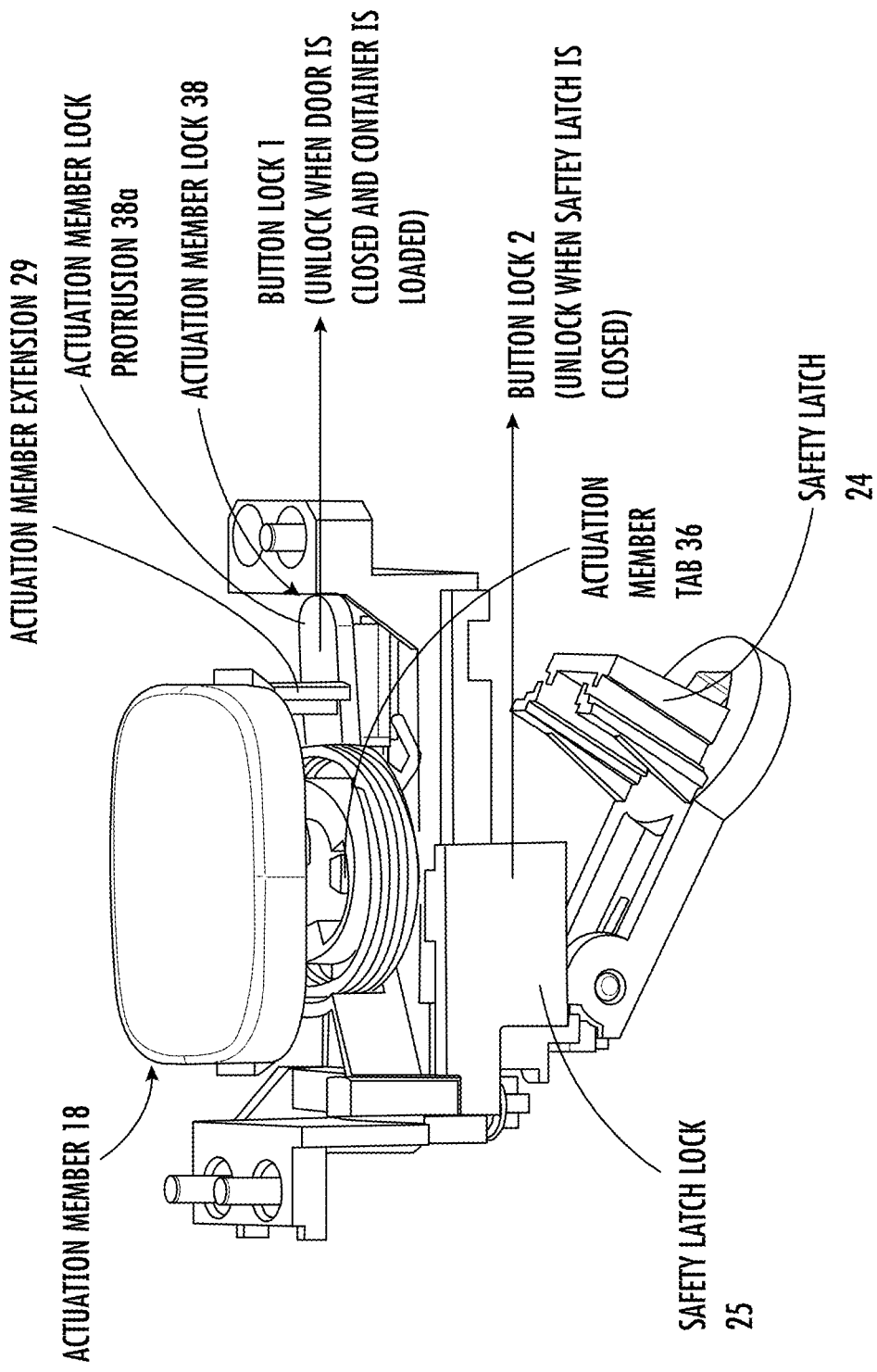
FIG. 5 is a perspective view of some internal components of the resettable injection training device embodiment shown in FIG. 1, including a safety latch, actuation member and locks related thereto.

Turning to FIGS. 5-7, the actuation member 18 may include, for example, a compressible member that is actuatable to initiate actuation of the device 100. In this case, actuation of the actuation member 18 causes the member 18 to move from a first position to a second position, wherein following actuation, the actuation member 18 remains in the second position until reset of the device 100. In some non-limiting embodiments, the actuation member 18 may include a digitally activated component. The device 100 may include an actuation member sensor 22e for detecting activation or actuation of the actuation member 18. In one embodiment, the actuation member 18 may move from a first (inactivated) position to a second (activated) position upon activation thereof, wherein following actuation, the actuation member 18 may be maintained in the second position until reset of the device 100. The inactivated and activated positions of the actuation member 18 are shown in FIGS. 8A-8B.

Figure 7A:
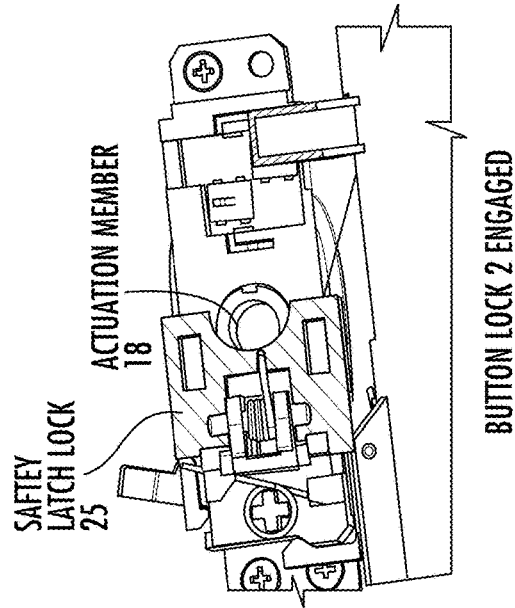
FIGS. 7A-7B are views of the internal components of the resettable injection training device embodiment shown in FIG. 1, showing in FIG. 7A the safety latch lock engaged, and in FIG. 7B the safety latch lock disengaged.
Figure 7B:
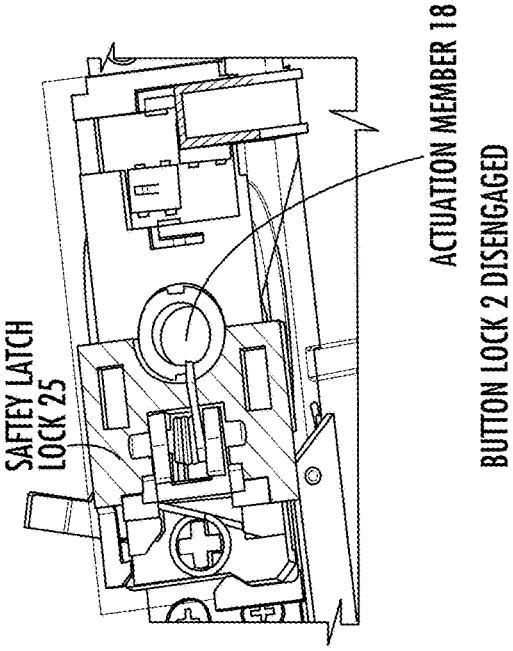
Figure 6A:
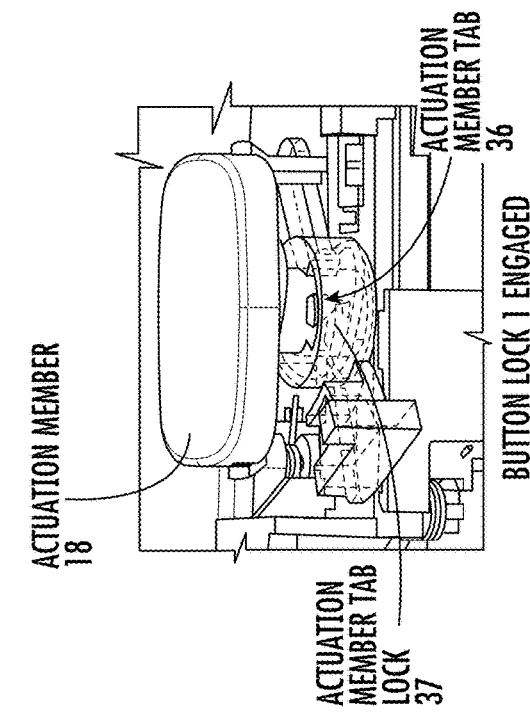
FIGS. 6A-6B are views of internal components of the resettable injection training device embodiment shown in FIG. 1, showing in FIG. 6A the actuation member lock engaged, and in FIG. 6B the actuation member lock disengaged.
Figure 6B:
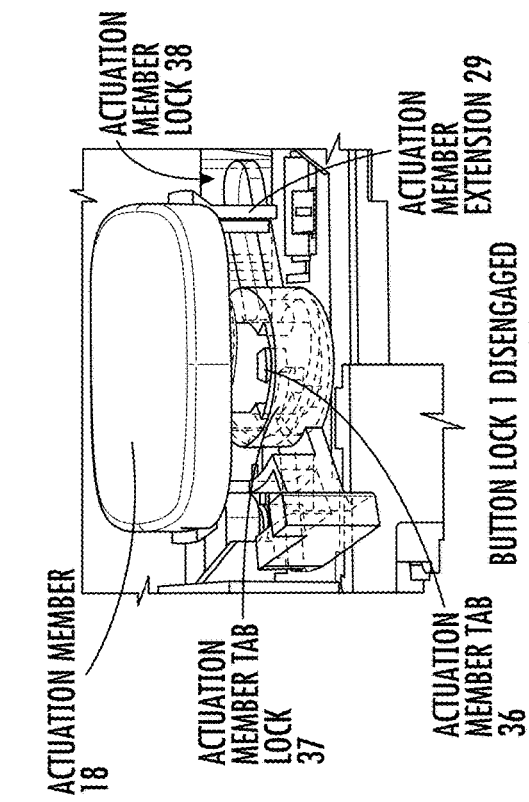

As described above, the safety latch 24 of the device 100 may be biased toward an open position as shown in FIG. 5, in one embodiment, wherein when the device 100 is positioned against a target site, the safety latch 24 moves to a closed position, and a safety latch lock 25 is inactivated or "unlocked". The safety latch lock 25 associates with the safety latch 24, and interfaces with the actuation member 18 to provide a second lock/unlock of the actuation member 18 as shown in the underside device 100 view of FIGS. 7A-7B. The safety latch 24 does not lock or unlock in at least one embodiment as described herein. Movement of the safety latch 24 from an open position to a closed position, in some instances against the pressure of a biasing member associated with the safety latch biasing the safety latch 24 in the open position, unlocks (i.e., obstructs) the actuation member 18 as shown in FIG. 7B, allowing the actuation member 18 to move freely into an activated position. FIG. 7A shows a partial sectional view of the underside of the actuation member 18, wherein the safety latch lock 25 is in a locked position, at least partially obstructing the actuation member 18. FIGS. 5, 6A and 6B show a rotatable actuation member lock 38 which interfaces with the container 16 and/or the receptacle 12, wherein the actuation member lock 38 includes an actuation member tab lock 37 that interfaces with the actuation member tab 36 to prevent actuation of the actuation member 18. The actuation member lock 38 is shown in a locked position in FIG. 6A and an unlocked position in FIG. 6B. The actuation member lock 38 selectively rotates between a locked and an unlocked position as a result of its interaction with the container 16. Once both the actuation member lock 38 (via actuation member tab 36 and actuation member tab lock 37) and the safety latch lock 25 are both in an unlocked position as shown in FIGS. 6B, and 7B, respectively, the actuation member 18 may be actuated to initiate an injection training. The actuation member lock 38 is unlocked by loading of the container 16 into the receptacle 12 and moving the receptacle 12 to a closed position. The safety latch lock 25 is unlocked by closing the safety latch 24.

In at least one embodiment, the actuation member 18 is not actuatable until the container 16 is received within the receptacle 12, the receptacle 12 is in the closed position as shown in FIG. 2B, and the safety latch 24 is in the closed position. In at least one embodiment, the receptacle 12 cannot enter its closed position if the container 16 is not received within the receptacle 12. When the container is correctly and fully received within the receptacle 12, the door latch 13 is displaced such that the receptacle 12 can close as shown in FIGS. 1, 2A-2B.

Figure 8B:
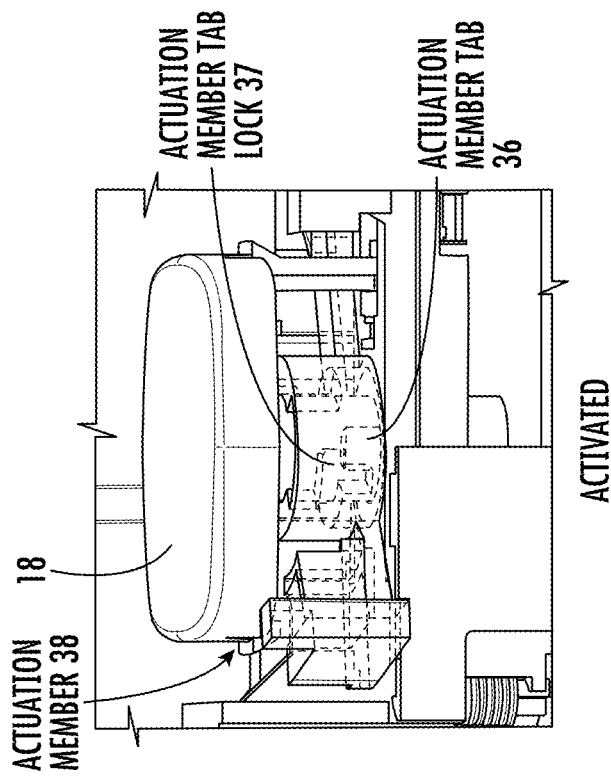
FIGS. 8A-8B show views of the internal components of the resettable injection training device embodiment wherein an actuation member tab lock and actuation member tab interface to activate or inactivate the actuation member.
Figure 8A:
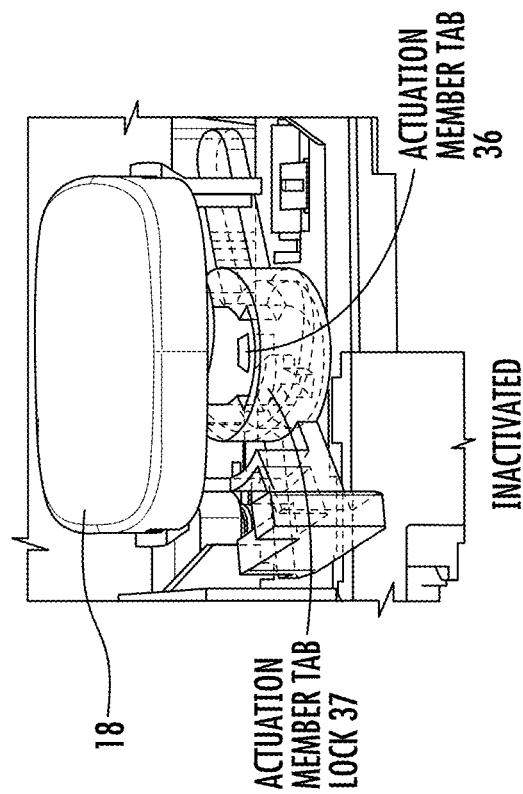

Once the actuation member 18 is in ready to be actuated (i.e., unlocked), the actuation member 18 may be actuated as shown in FIGS. 8A-8B. FIG. 8A shows the actuation member 18 in an inactivated position, and FIG. 8B shows the actuation member 18 in an activated position once compressed by the user. In at least one non-limiting embodiment, the actuation member 18 will remain in the activated position shown in FIG. 8B via the interface between the actuation member tab lock 37 and the actuation member tab 36 as shown in the highlighted region of FIG. 8B until reset.

Figure 9A:
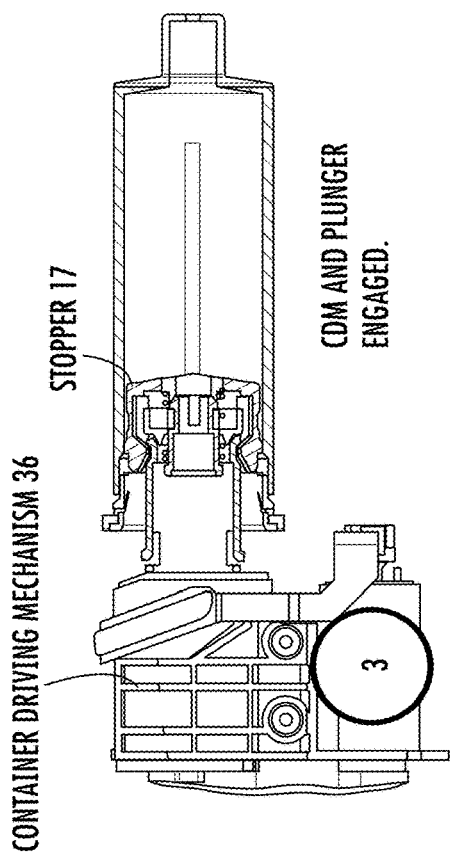
FIGS. 9A-9D show sectional side views of the resettable container and an interfacing container driving mechanism in various positions during use of the device.
Figure 9C:
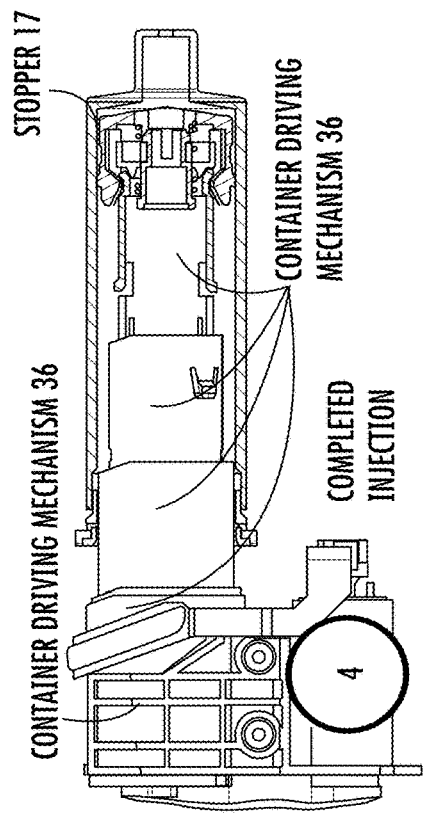
Figure 9B:
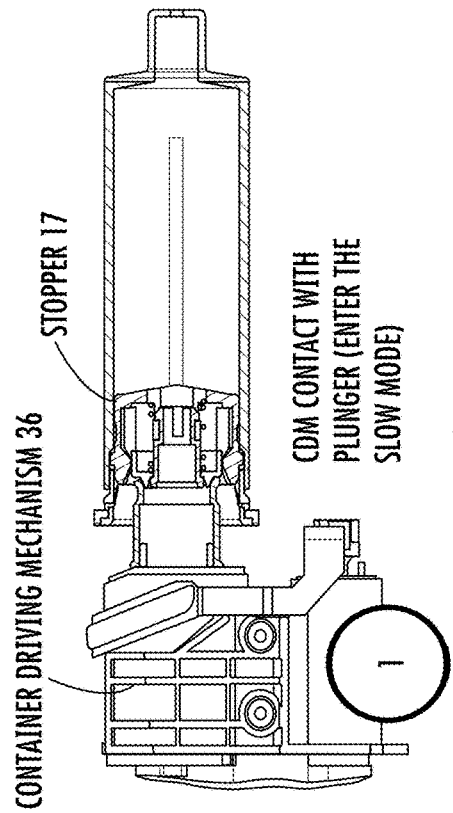
Figure 9D:
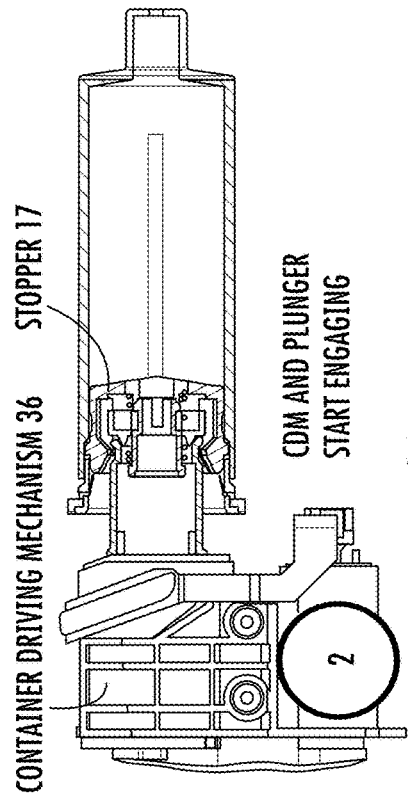

FIGS. 9A-9D provide views of the interface between the container driving mechanism (CDM) 36 and the stopper 17 of the container 16. In FIG. 9A the CDM 36 interfaces with the stopper 17 (in some embodiments, with a plunger that interfaces with the stopper 17), FIG. 9B shows the engagement between the components, FIG. 9C shows completion of engagement between the CDM and the stopper 17. In FIG. 9D, the CDM 36 causes the stopper 17 to move to the distal end of the container 16 completing an injection delivery/training. The CDM 36 comprises a motorized component, and is also initiated to reset the container 16 as shown in detail in FIGS. 10a-10D by interfacing with the stopper 17 in a similar fashion and retracting the stopper into the container (moving it from the distal end to the proximal end thereof).

During use of the device 100, initiation of the actuation member 18 initiates the container driving mechanism 36 to engage the stopper 17 to move distally within the container body 19 to simulate an injection. Following actuation of the device 100, the actuation member 18 is locked in the second position as shown in FIG. 11A until reset of the device 100. An actuation member sensor 22e shown in FIG. 14B may detect actuation of the actuation member 18. Reset of the device 100 is first initiated by actuating the reset member 46 shown in FIG. 11B. Actuating the reset member 46 initiates the reset of the device by first resetting the resettable container 16 as shown in FIGS. 10A-10D. A reset member sensor 22c as shown in FIG. 14A detects actuation of the reset member 46. Initiation of reset causes the container driving mechanism 36 to reset the stopper 17 and to reset the container driving mechanism 36 to its starting position. A container driving mechanism sensor 22f shown in FIG. 14A detects reset of the container driving mechanism 36.

Figure 10A:
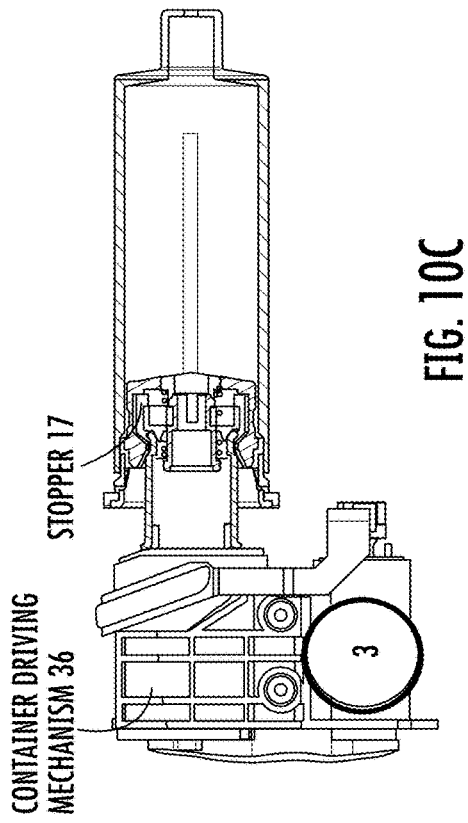
FIGS. 10A-10D show sectional side views of the resettable container and an interfacing container driving mechanism in various positions during reset of the container.
Figure 10B:
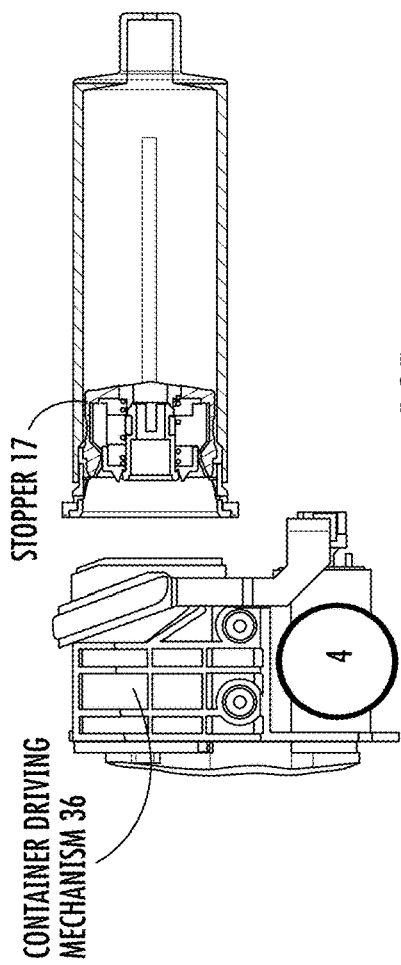
Figure 10C:
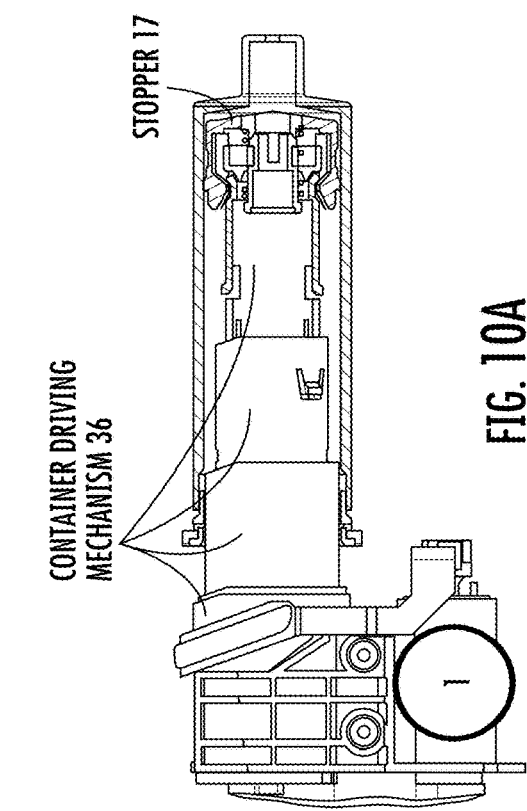
Figure 10D:
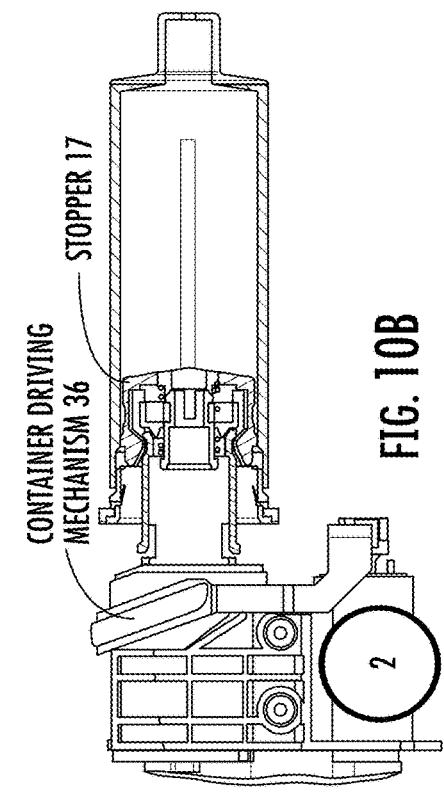

In at least one embodiment, reset begins by initiating the motor of the container driving mechanism 36 to reverse movement to move the stopper 17 from the distal end of the container 16 toward the proximal end as shown in FIGS. 10B-10C. FIG. 10D shows the stopper 17 and the container driving mechanism 36 fully reset to their starting positions. A container status sensor 22g (shown in FIG. 14A) may detect a position of the stopper 17 during use or reset. The container status sensor 22g may include an optoelectronic sensor in at least one embodiment.

Once the container has been reset, the actuation member 18 can be reset. Initiation of reset of the actuation member 18 occurs by opening the receptacle 12 as shown in FIG. 11B, which disengages the actuation member lock 38, releasing the actuation member 18 to its starting position.

The actuation member 18 interfaces with an actuation member lock 38 to lock the actuation member 18 in the second position until the device is reset as shown in FIG. 11A demonstrating the locked position of the actuation member lock 38. As described above, FIGS. 8A and 8B also show the interactivity between the actuation member lock 38 and the actuation member 18 via the actuation member tab lock 37 of the actuation member lock 38 which interfaces with the actuation member tab 36 of the actuation member 18 to maintain the actuation member 18 in a locked position once activated and until reset, in one embodiment.

Figure 11B:
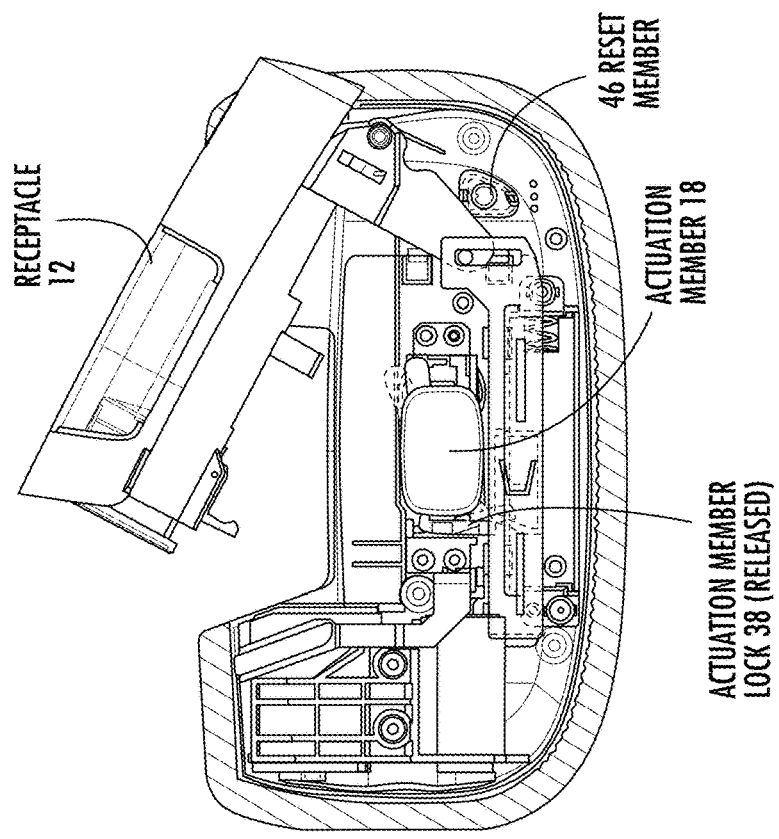
FIGS. 11A-11B show sectional front views of the device embodiment shown in FIG. 1, demonstrating the steps of reset of the device.
Figure 11A:
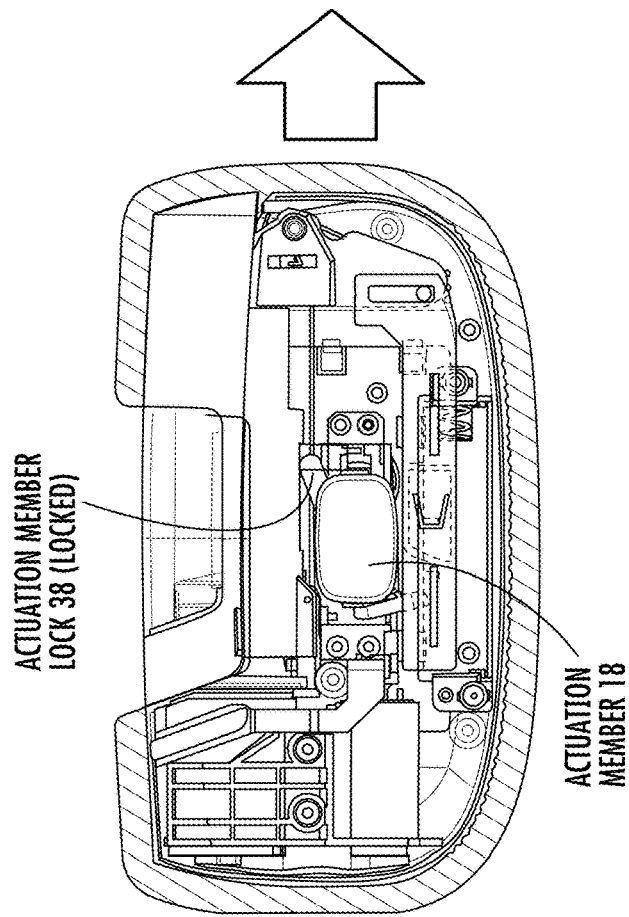
Figure 12C:
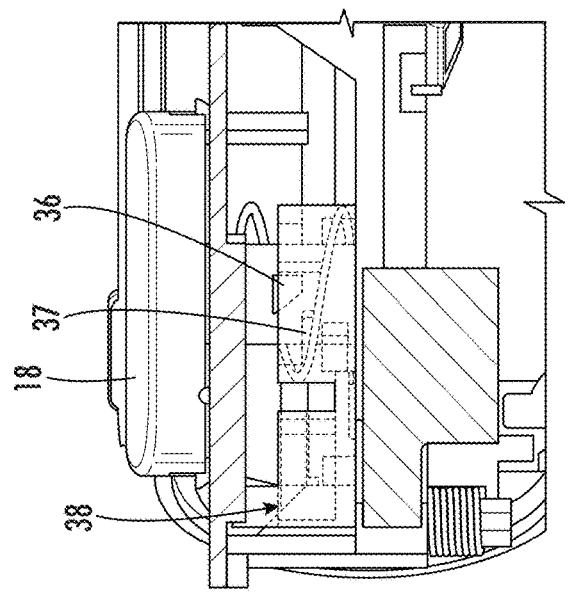
FIGS. 12A-12C show partial sectional views of the steps of reset of the actuation member and interactivity with other components of the device.
Figure 12B:
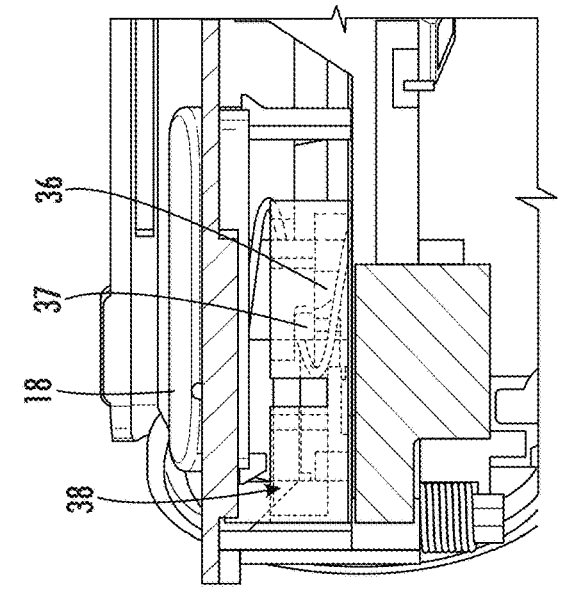
Figure 12A:
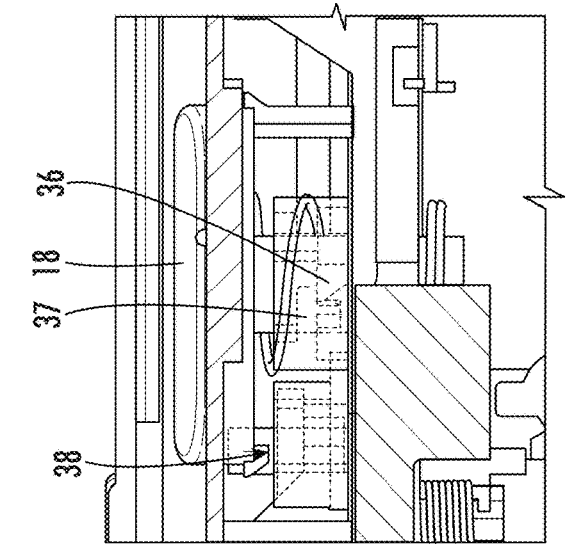
Figure 13A:
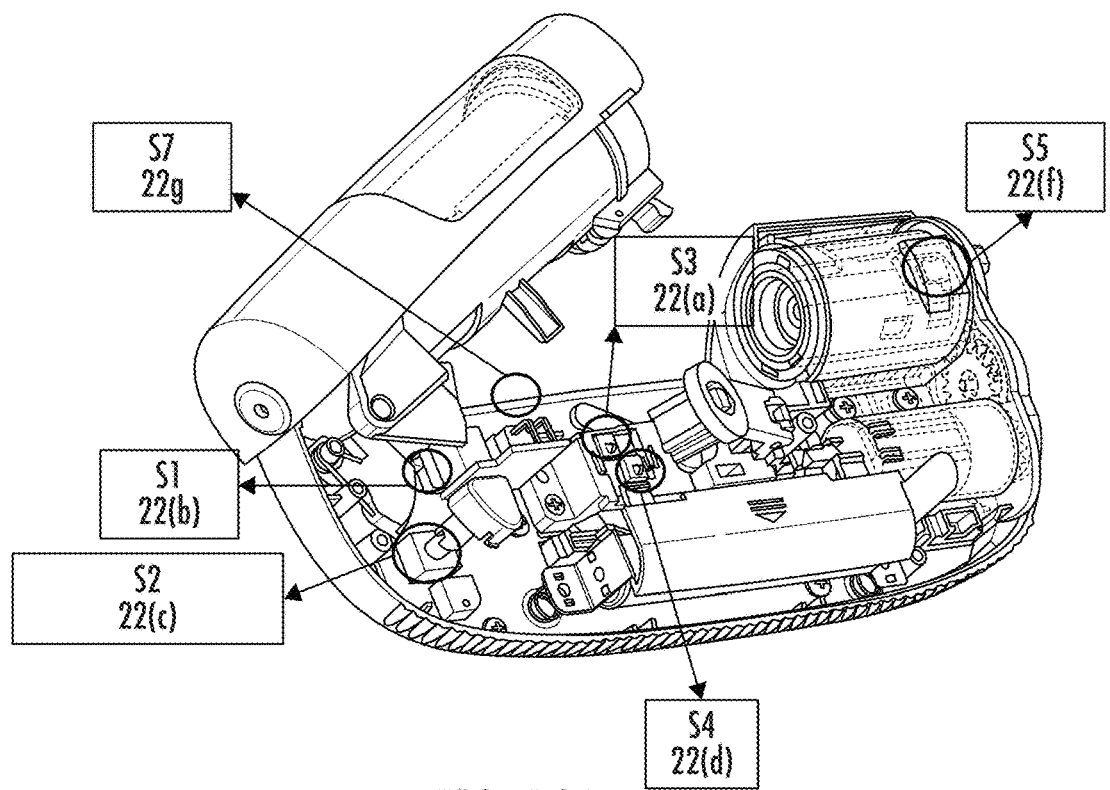
FIG. 13A-13B provide perspective views of the internal components of an embodiment of the resettable injection training device demonstrating positions of various optional sensors.
Figure 13B:
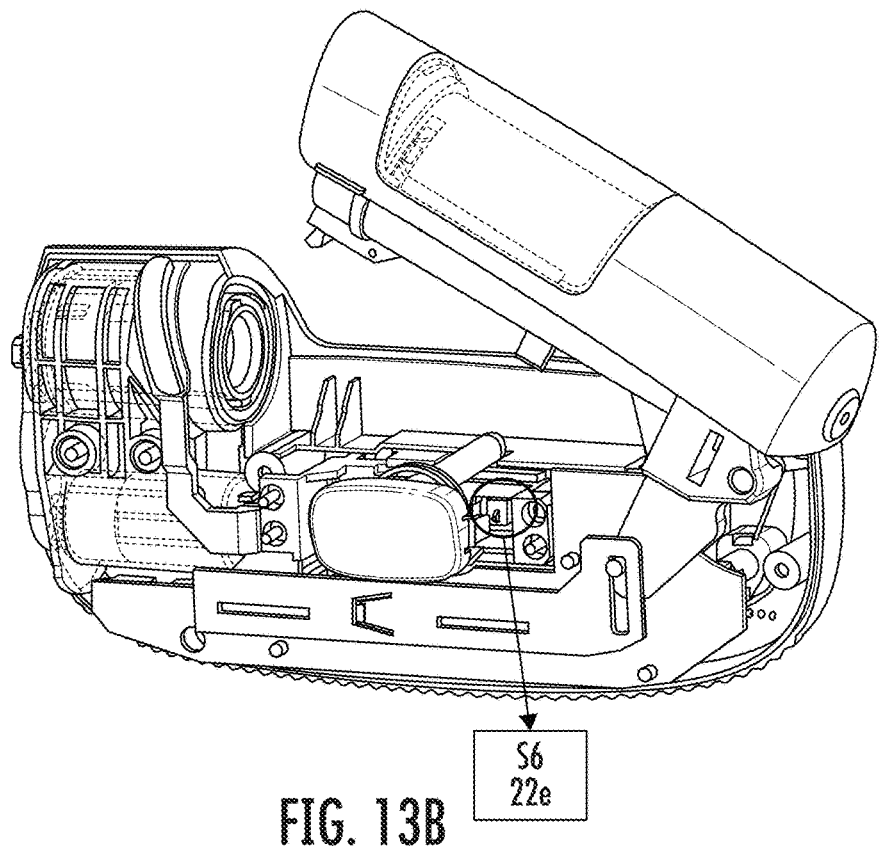
Figure 16:
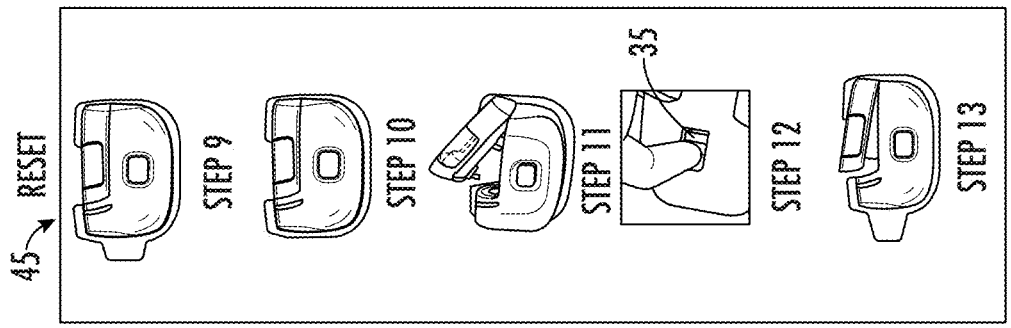
FIG. 16 provides the steps of reset of the device, according to one embodiment.

To continue reset of the device 100, once the container 16 has been reset, the receptacle 12 is moved to its open position as shown in FIG. 11B. Opening the receptacle 12 as shown in FIG. 11B during reset, release the actuation member lock 38, releasing the actuation member 18 for a subsequent training. FIGS. 12A-12C show another view of the reset of the device 100, wherein reset of the container driving mechanism 36 resets the stopper 17 in the container, and moving the receptacle 12 to the open position, in some instances by manually opening the receptacle 12, causes the actuation member 18 to be released as show in FIG. 12C.

As described above in reference to FIG. 4, embodiments of the device may include a removable adhesive pad 32 having a removable adhesive 30. The removable adhesive pad 32 and adhesive 30 provides for multiple repeated uses of the device 100, wherein between each use or each user of the device, the adhesive pad 32 may be removed and replaced. In at least one embodiment, an adhesive protrusion 35 shown in FIG. 4 may be manipulated to release the adhesive pad 32 from the device 10. The removable adhesive pad 32 may be removably clipped onto the housing 10.

Figure 14:
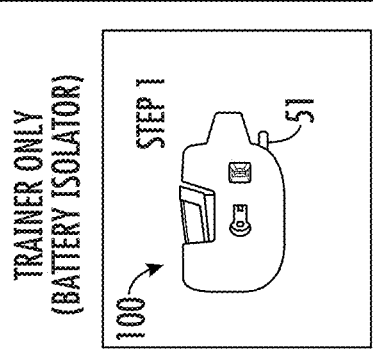
FIG. 14 shows the device and a battery isolator that is optionally present in the device upon receipt.

FIG. 14 shows an embodiment 100 of the device wherein prior to use, a battery isolator 51 may be associated with the power source 50, but may be removed prior to use of the device 10.

Figure 15:
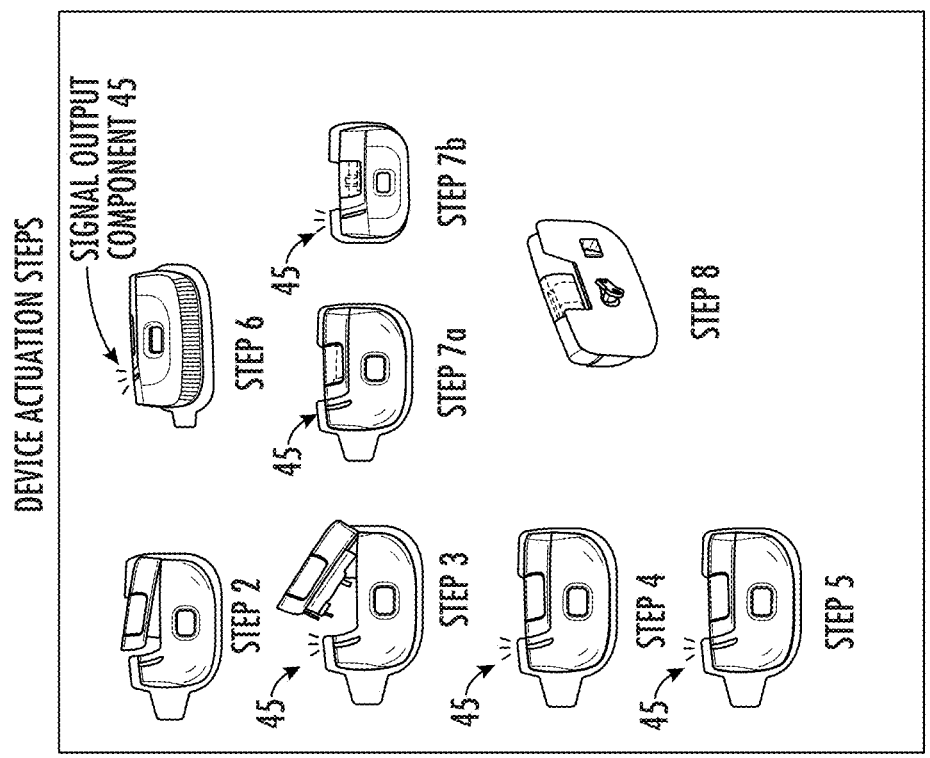
FIG. 15 provides the steps of actuation of the device according to one embodiment.

FIG. 15 shows the steps of use of the device embodiment 100, including the optional removal of the battery isolator 51 (in embodiments where it is present prior to first use of the device 10), and the optional placement of the adhesive pad 32 onto the device 10 and removal of the adhesive 30, in instances where no adhesive pad 32 has been placed on the device 10. FIG. 17 provides a description of the steps of use of the device 100 (steps 1-8) and reset of the device (steps 9-13). As shown in FIG. 17, step 7b, if the device is moved from the injection site or target site prior to completion of the injection training, the device 100 enters an error mode. The error modes are shown in greater detail in FIG. 20 and explained below (see for example E1, E2). For purposes of FIG. 17, TSA is also known as the container driving mechanism, and plunger and stopper may be used interchangeably. In some alternative embodiments, a plunger and stopper may be separate elements, but may be associated with one another, such that the stopper and plunger move together within the container.

FIG. 18 demonstrates steps (and maps the logic that occurs) in the correct use of the device 100. FIG. 19 demonstrates various errors or error conditions that could occur during use of the device 100 (and maps the logic that occurs) in the sequence. FIG. 22 describes the various steps in the sequence shown in FIGS. 18-19. In particular, errors in the sequence can be found at steps C2, E2, G2, H2, K2, and the result of such errors are described in FIG. 22. For example, if the user removes the device from the injection or target site before the injection is completed, an error indication of a "wet injection error notification" may be provided to the user, the motor may be stopped and the error notification may continue for a predetermined time (i.e., 60 seconds). As an option, the device may then reset automatically. FIG. 20 is a map of the logic and steps that occur to activate reset and to replace the battery of the device in one embodiment. A wet injection may be detected with a sensor for detecting contact between the device and the target surface, wherein removal of contact therebetween is detected while the device detects the injection simulation is in progress.

FIG. 21 describes the various sleep modes of the device. For example, in Sleep Mode 1, the receptacle is semi-closed, and the actuation member (i.e. button) is inactivated in a raised position. In Sleep Mode 2, the actuation member is in a raised position, and in Sleep Mode 4, the actuation member is in a depressed position, but in both Sleep Mode 2 and 4, the receptacle is closed, container is received within the receptacle (i.e., loaded), and the plunger is in the starting position. The actuation member (button) can be in an activated (recessed position) or an inactivated (raised position). In Sleep Mode 3, the receptacle is fully open and the actuation member is in an inactivated (raised) position.

In at least one embodiment, a method 300 for training a user to deliver an injection with a resettable injection training device 100 comprising a housing 10, a receptacle 12 for receiving a resettable container 16, an actuation member 18 to actuate the device 100, a safety latch 24 for placement against a target surface, one or more sensors 22a-22g for sensing a condition of the device, and a processor, the method 300 including inserting 302 a resettable removable container 16 into a receptacle 12 of a resettable injection training device 10, said receptacle 12 having an open position and a closed position; moving 304 the receptacle 12 to its closed position; placing 306 the resettable injection training device 10 against a target surface such that the safety latch 24 is moved to a closed position; and actuating 308 the device 10 by activating the actuation member 18. The method may further include, wherein the device 10 further comprises a signal output component 45, wherein feedback is delivered via the signal output component 45 based on the condition of the device 10. The method 100 further includes wherein the device 10 further includes a removable adhesive pad 32 containing an adhesive surface 30 for affixing the housing 10 to a target surface, wherein before the placing 306 step, a removable adhesive pad 32 is attached to the housing 10.

Another method 400 embodiment may be described herein, wherein the resettable injection training device 100 may be reset. The reset method 400 may be initiated by actuating 402 a reset member 46, which initiates mechanical (or in some instances where the container lacks mechanical components, digital) reset 404 of the resettable container disposed within the receptacle 12 of the device 100, once the container is reset, the receptacle 12 may be moved from a closed position to an open position to allow removal of the container from the opening, this movement of the receptacle in turn releases and resets the actuation member 18 to a reset position in preparation for a subsequent use.

Various embodiments described herein may include signal output components which may provide a guide and/or user feedback for using the device. The signal output component may include a visual, audible, vibratory, smellant, gustatory, or other feedback. For example, the device may include a number of lights to deliver information to a user providing visual notification or feedback. For example, a flashing light may indicate the user may need to close the receptacle, or to actuate the mechanism, therefore, this feedback may guide a user through use of the system. Alternatively, or in addition, the light may include various colors, wherein a red light may be used to indicate to a user that an incorrect step in the use of the device was performed, for example, or a green light may be used to provide positive feedback that a correct step in the use of the device was performed. In this manner, a user may be guided through use of the device. Additionally, or alternatively, speakers may be provided as a signal output component to deliver audible feedback to a user to deliver either corrective feedback, error messages, or positive feedback, for example, to assist a user in using the device. In one example, an error message or beep may be delivered through the speaker if a user makes an incorrect use of the device, for example, if the user does not correctly place the container in the receptacle prior to closing the receptacle, or if the user attempts to actuate the device before the receptacle is closed and before the safety latch is engaged/closed, an error message or error sound may be delivered.

The conditions detected by the device may include correct operations of the device, or error conditions (incorrect operations of the device0, in non-limiting examples. One such error condition may include a wet injection error, as mentioned above, wherein when a sensor for detecting contact between the housing and a target site does not detect contact with the target site, after the actuation member has been actuated and prior to completion of a training event, an error condition is detected. In particular, a wet injection error is detected in this scenario. A wet injection error condition may be used to prevent users from 1) incorrectly placing the device on a contact site of a user during an injection training event, or 2) correctly placing the device during an injection training event followed by removal of the device from the contact site of the user, in non-limiting embodiments. The device may further include a timekeeping component, such that based on a combination of detecting removal of contact of the device from the target area and time, a wet injection error condition may be detected, in one non-limiting example. The system may further include a signal output component as mentioned above (i.e., speaker or light or display, in non-limiting examples) for providing auditory instructions for use of the device and/or auditory feedback, prior to, during, or following use of the device and/or system. The signal output component may further indicate the start and/or completion of a simulated dose using the device and/or system during a training event. The indication may be provided with an auditory signal, such as a beep, in a non-limiting example. Other indicators known to those skilled in the art may also, or alternatively be used.

The device may provide stepwise instructions for using the device to the user. The instructions may be initiated (or the device may be powered on) upon removal of the injection training device from the package, in one embodiment, or upon opening and/or loading the receptacle, and/or actuating the actuation member, and/or closing of the safety latch, or a combination thereof.

In another embodiment, the medicament delivery training device further includes a processor or microprocessor (either, or both of which may be included in the device). The device may include circuitry which may include at least in part, the processor, the signal output component for initiating audio, and visual, outputs, among other electronic components. The components may be operatively coupled by electrical conductors, however, in other embodiments the components may be operatively coupled without being physically connected. For example, in some embodiments, at least a portion of the components included in an electronic circuit system can be inductively coupled. In other embodiments, at least a portion of the components included in an electronic circuit system can be evanescently coupled.

The circuitry of the device may include a flexible printed circuit board to electronically couple with the components contained therein. The circuitry may be disposed in any suitable manner relative to the housing of the device, or may be associated with the housing of the device. In some embodiments, for example, the circuitry can be integrated with the simulated medicament delivery training device. The circuitry can be contained within the housing, and/or it may be partially or fully assembled concurrently with and/or with the same processes of the medicament delivery training device, the circuitry may alternatively or in addition be provided on the outer portion of the housing of the device.

In yet another embodiment, a non-transitory computer-readable medium embedded in a training device is disclosed. The non-transitory computer readable medium stores instructions executable by the processor, microprocessor or another processing device to cause the processing device to output audio via the signal output component in the medicament delivery training device in response to an activation of a responsive member on a control interface of medicament delivery training device to guide a user through the stepwise instructions for operation of the medicament delivery training device in response to the user input and to instruct the user to actuate the actuation member of the device to simulate an actual medicament delivery in response to an actuation of the actuation member of the device.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

Powering on the device, in some embodiments, initiates or activates the stepwise instructions to the user. However, the instructions may be initiated or activated by any suitable means known in the art. For example, in another embodiment, activation of the actuation member may initiate the stepwise instructions of the device. In yet another embodiment, the stepwise instructions may be initiated by moving the device, which may be recognized via a motion sensor on or associated with the device. In still another embodiment, a user input via the actuation member of the device may activate or initiate the instructions.

The device may further include a control interface which may provide the user with the ability to change the language of the audio output of the device. Languages that the audio output may be communicated to a user include but are not limited to, English, Spanish, French, Arabic, Portuguese, Russian, Chinese, and Japanese. It is known by those of skill in the art that any language may be provided via the audio output of the device.

In some embodiments, the device is associated with a memory storage module which may be either a removable or a non-removable memory storage module. Memory contained in this module may include various languages of audio, updating information for the device, information about various medical conditions and medicaments including usage, storage, and any other important information associated therewith. The memory module may further comprise a script for guiding the user through the steps of the medicament delivery simulation.

What is claimed is:

1. A resettable injection training device, comprising:
   a housing defining a receptacle having an opening, said housing comprising a top side and a bottom side;
   a resettable, removable container, receivable within the receptacle, said container comprising a stopper movable within the container;
   an actuation member configured to simulate actuation of an injection device;
   one or more sensors comprising a container sensor for detecting receipt of the container within the receptacle;
   a safety latch extending from the bottom side of the device, said safety latch for contacting an injection site; and
   a processor for detecting a condition of the one or more sensors, and optionally, providing feedback based on the condition detected.

2. The resettable injection training device of claim 1, further comprising a removable adhesive pad associated with the housing for affixing the housing onto the injection site during use of the device.

3. The resettable injection training device of claim 1, wherein the receptacle hinges from an open position to a closed position, wherein in the open position, the container is receivable within the receptacle.

4. The resettable injection training device of claim 3, further comprising a receptacle latch, wherein when the container is received within the receptacle, the latch is in a closed position, and the receptacle may be moved to the closed position.

5. The resettable injection training device of claim 3, further comprising a receptacle sensor for detecting the position of the receptacle relative to the housing; and optionally, for detecting receipt of the container within the receptacle.

6. The resettable injection training device of claim 1, further comprising a safety latch sensor for detecting whether the safety latch is in an open or closed position relative to the housing.

7. The resettable injection training device of claim 1, wherein when the container is fully engaged, the receptacle is in a closed position, and the safety latch is in a closed position, the actuation member is in an active position and can be actuated to initiate an injection training.

8. The resettable injection training device of claim 7, further comprising an actuation member sensor for detecting actuation of the actuation member.

9. The resettable injection training device of claim 1, wherein the actuation member comprises a compressible member that is compressible to initiate actuation of the device, such that actuation of the actuation member causes the member to move from a first position to a second position, wherein following actuation, the actuation member remains in the second position until reset of the device.

10. The resettable injection training device of claim 9, wherein the safety latch is biased toward an open position, wherein when the device is positioned against a target site for a training, the safety latch moves to a closed position, and a safety latch lock is inactivated.

11. The resettable injection training device of claim 1, wherein actuation of the actuation member initiates the container driving mechanism to engage the stopper to move distally within the container body to complete an injection simulation.

12. The resettable injection training device of claim 9, wherein the actuation member interfaces with an actuation member lock to lock the actuation member in the second position until reset of the device.

13. The resettable injection training device of claim 9, further comprising a reset member for initiating reset of the device upon actuation of the reset member, and optionally, a reset member sensor for detecting initiation of reset.

14. The resettable injection training device of claim 13, wherein activation of the reset member initiates reset of the container driving mechanism to its starting position.

15. The resettable injection training device of claim 14, further comprising a container driving mechanism sensor for detecting reset of the container driving mechanism.

16. The resettable injection training device of claim 14, wherein following reset of the container, movement of the receptacle to its open position releases the actuation member lock to unlock the actuation member for a subsequent use of the device.

17. The resettable injection training device of claim 11, further comprising a container status sensor for detecting a position of the stopper, said container status sensor optionally comprising an optoelectronic sensor.

* * * * *